Dec. 26, 1961 T. J. SCARNATO ET AL 3,014,328
MOUNTING MEANS FOR A TRACTOR MOWER
Filed March 26, 1959 3 Sheets-Sheet 2
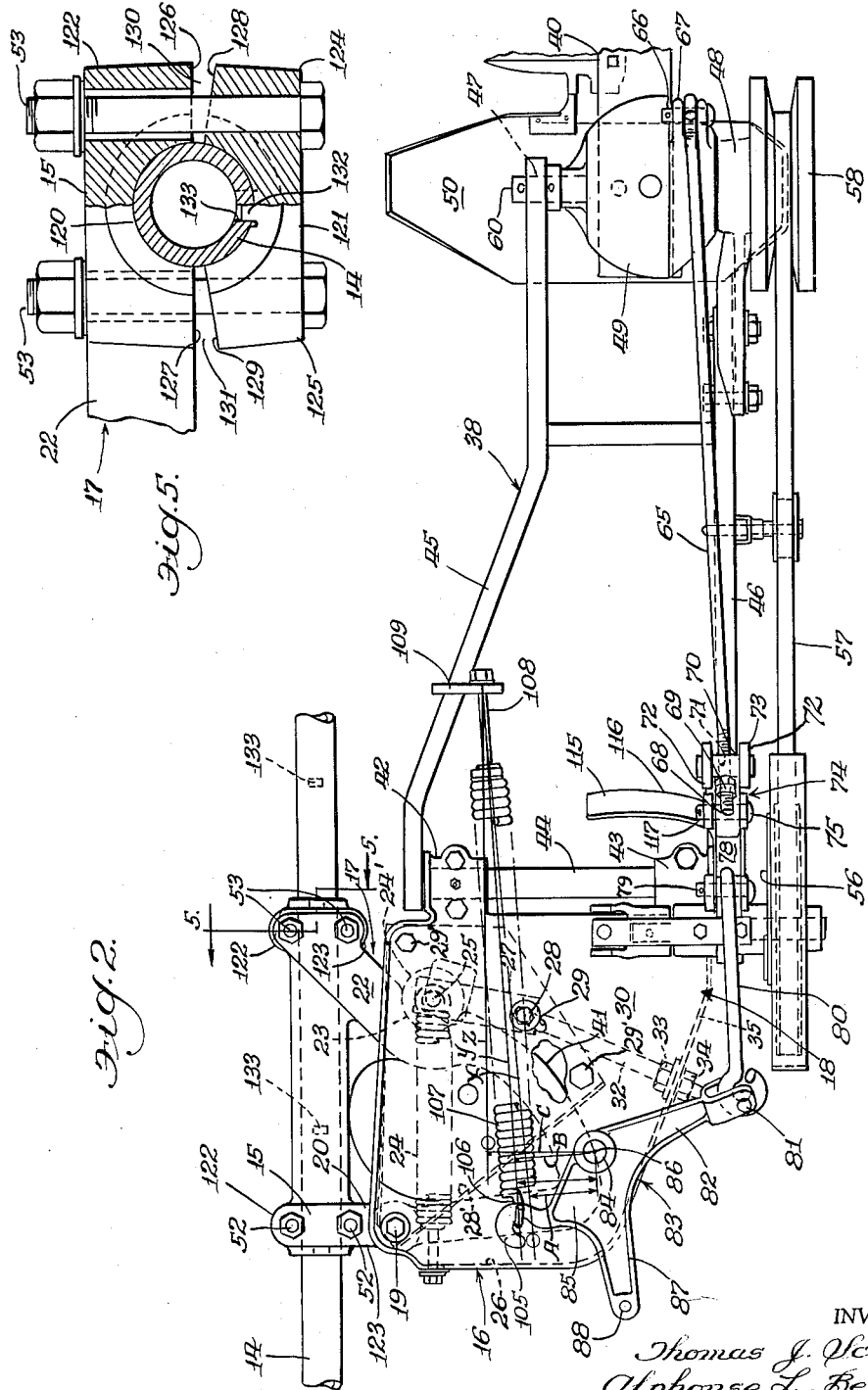
INVENTORS.
Thomas J. Scarnato
Alphonse L. Berzinski
Paul O. Pippel
Atty.

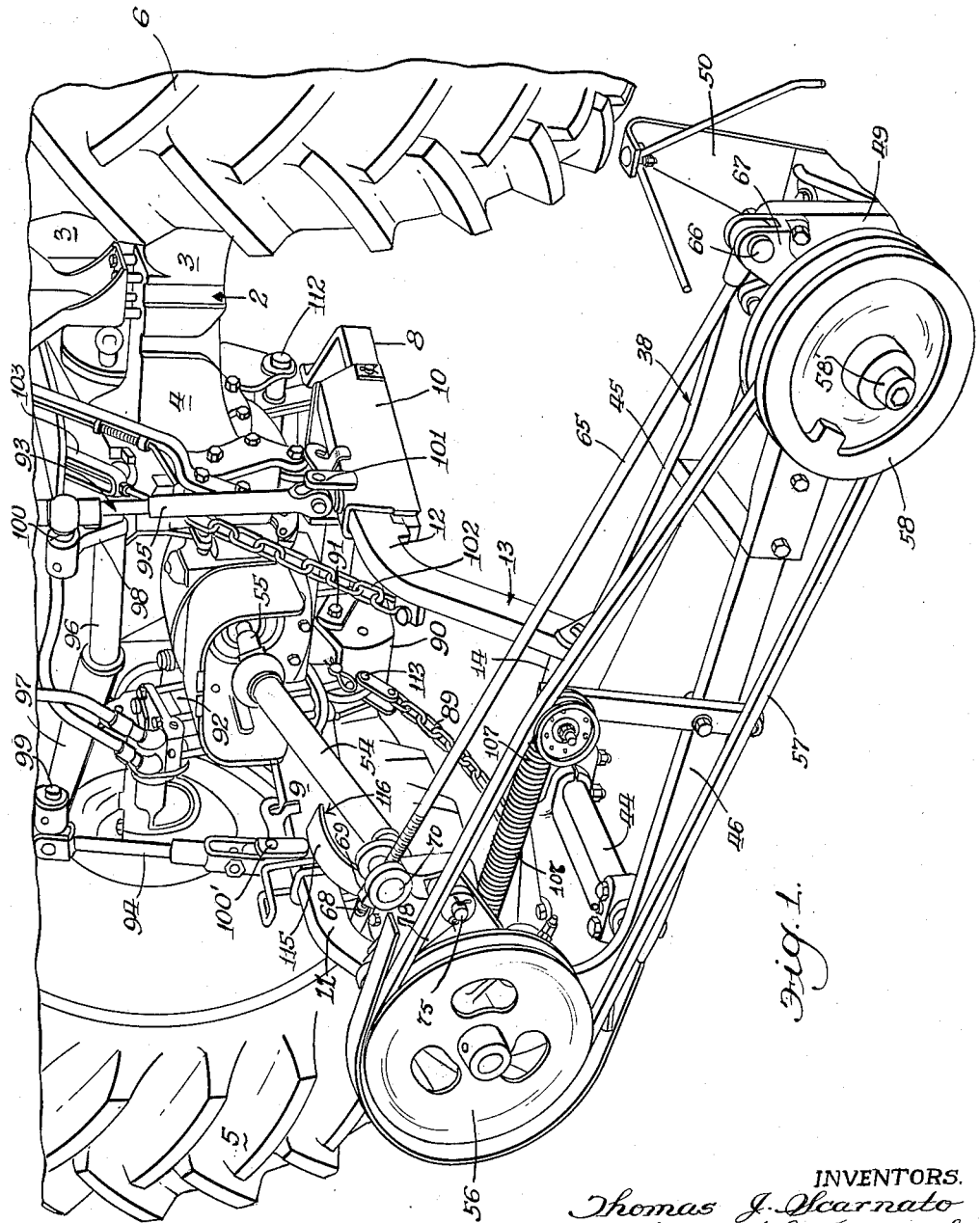

Dec. 26, 1961　　T. J. SCARNATO ET AL　　3,014,328
MOUNTING MEANS FOR A TRACTOR MOWER
Filed March 26, 1959　　3 Sheets-Sheet 3
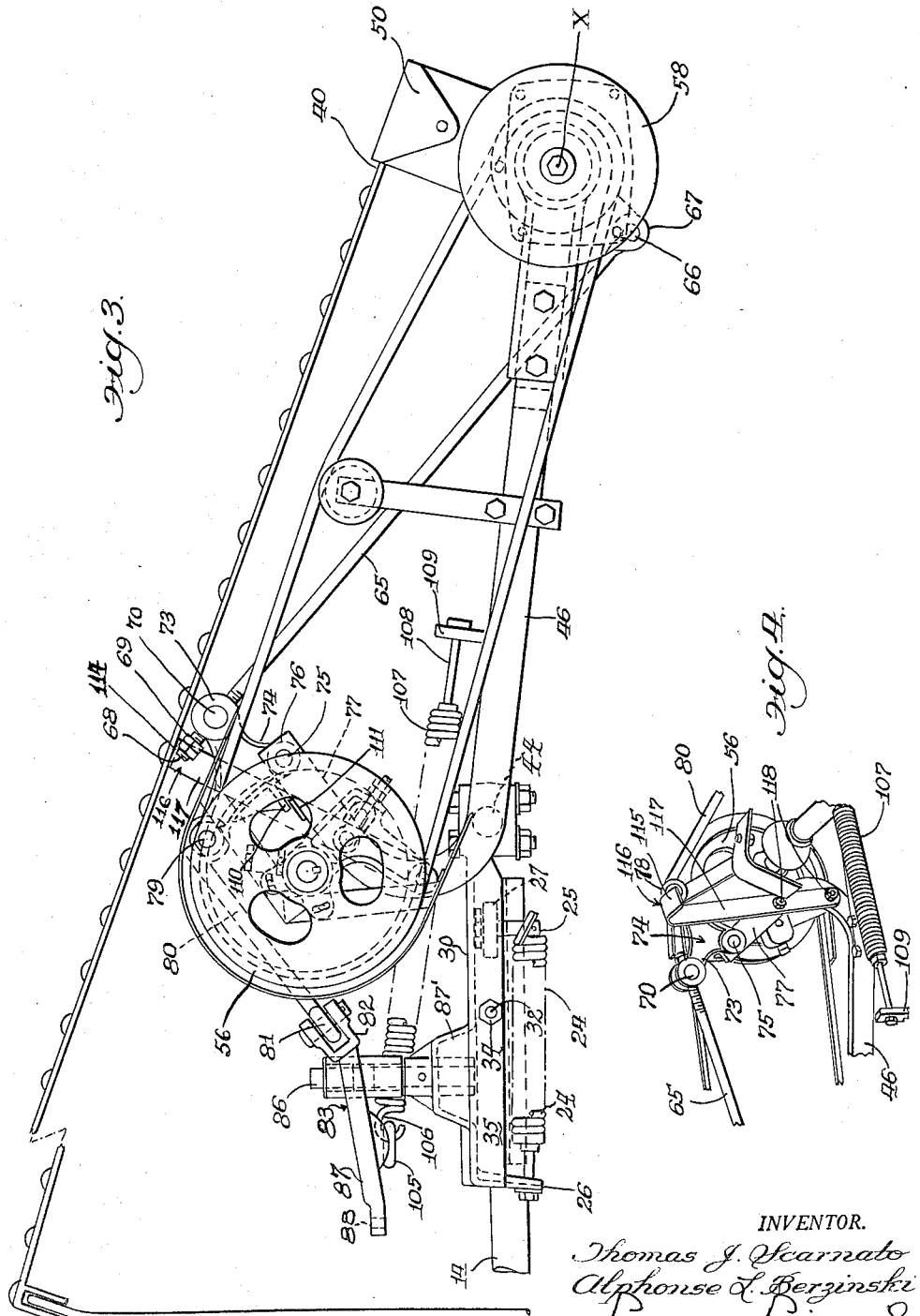
INVENTOR.
Thomas J. Scarnato
Alphonse L. Berzinski
Paul O. Pippel
Atty.

3,014,328
MOUNTING MEANS FOR A TRACTOR MOWER
Thomas J. Scarnato, Park Ridge, and Alphonse L. Berzinski, Chicago, Ill., assignors to International Harvester Company, Chicago, Ill., a corporation of New Jersey
Filed Mar. 26, 1959, Ser. No. 802,080
13 Claims. (Cl. 56—25)

This invention relates to mowers and more specifically to a novel mounting and support therefor.

A general object of the invention is to provide a novel mower mounting which is adaptable for use with tractors of different wheel widths without the necessity of complicated rearrangements of the parts.

A different object of the invention is to provide a novel support and mounting for the mower bar such that it may be folded over in transport position and wherein the assisting springs are arranged to maintain substantially constant tension on the lift and gag linkage.

A further object of the invention is to provide an arrangement of the lifting springs which in the operating position of the mower serves to lift the mower bar and maintain proper inner and outer shoe weight and in the transport position serves to hold the cutter bar in horizontal transport position without the aid of a stay rod.

A still further object of the invention is to provide a novel arrangement of the helper or lifting spring means such that they alone sustain the mower bar through the gag and lifting linkage in transport position without the aid of the operating cylinder whereby the said cylinder and the entire mower may be removed from the tractor while the assisting spring means sustain the mower in transport position.

These and other objects of the invention will become more apparent from the specification and the drawings wherein:

FIG. 1 is a perspective view illustrating the invention connected to an associated tractor part;

FIG. 2 is a fragmentary plan view of the mower assembly;

FIG. 3 is a rear view illustrating the mower assembly in folded position;

FIGURE 4 is a fragmentary perspective view of a portion of the lifting linkage, and FIGURE 5 is an enlarged sectional view on line 5—5 of FIGURE 2.

Describing the invention in detail and having particular reference to the drawings, there is shown a tractor generally designated 2 which includes a body 3 with a rear axle structure 4 which is supported by laterally spaced traction wheels 5 and 6.

The tractor or motor unit or ambulatory support 2 carries a hitch structure 8 including a pair of rearwardly extending laterally spaced generally horizontally aligned arms with sockets 9 and 10 into which telescope the forward ends of prongs 11 and 12 of a drawbar structure generally designated 13, said drawbar structure 13 including a transverse member 14 interconnecting the rear ends of the arms 11 and 12 and providing between the arms 11 and 12 an area for connection by the flange structure 15 of the mower or supporting frame generally designated 16. The flange or clamp structure 15 is integrated with a rearwardly projecting main on front frame casting or structure generally designated 17 which telescopes into a supporting rear frame structure 18, said rear frame structure 18 pivoting about a bolt assembly 19 on a substantially vertical axis, the bolt assembly 19 passing through the left front corner of the casting 18 and the left leg 20 of said front frame 17.

The front frame 17 is a skeletal structure and in addition to the fore and aft projecting leg 20 includes a diagonal leg portion 22 which merges with the rear end of the leg 20 and extends diagonally forwardly therefrom and merges into the right end of clamp member 15. Intermediate its ends the leg 22 is provided with a concavity 23 which pockets the roller 24', said roller being urged into the pocket 23 in the operating position of the mower by means of a spring 24 which is hooked around a pin 25 mounting the roller, said spring extending to the depending flange 26 at the left side of the member 18. The roller is mounted by the pin 25 on an arm 27 which in turn is mounted at its rear end by a pin 28 operating through a fore and aft elongated slot 29 in the top web 30 of the member 18, said pin 28 being connected to the forward end of an adjusting link 32 which at its rear end is provided with a pair of nuts 33, 34 which embrace a rear web 35 depending from the rear edge of the top web 30 of the casting 18. The position of the pin 28 determines the fore and aft position of the arm 27 which in turn determines the position of the rear frame with respect to the forward frame and in turn controls the disposition of the supported main pivot frame 38 which mounts the mower structure generally designated 40 and thus controls the lead of the mower. It will be noted that the socket 23 merges into a rearwardly and leftwardly curving edge surface 41 on which the roller 24' rides as the mower swings rearwardly upon striking an obstruction about the pin 19, as will be readily understood by those skilled in the art, the roller 24' and arm 27 as well as pin 28 are supported by the plate 28' which is bolted by bolts 29' and bolt 19 to the top plate 30.

The main pivot or supported frame 38 is connected to the rear mower frame means by a pair of sockets or hinge portions or brackets 42, 43 which are formed on the rightward edge of the casting 18, the brackets 42, 43 admitting and pivoting on a substantially horizontal axis, a fore and aft extending shaft 44 which interconnects the inner or first ends of the front and rear beam members 45 and 46 of the pivot frame 38, said beam members 45 and 46 being elongated transversely of the direction of movement to the mower and at their outer on second ends being provided with sockets or apertures 47 and 48 about which pivots the housing 49 of the mower drive mechanism encased therein, said housing 49 incorporating a shoe structure 50 and supporting the driving mechanism and the mower 40 substantially as described in U.S. Patent 2,824,416.

The feature of the present invention is in the mounting of the front mower frame portion 17 on the cross member 14 of the drawbar in that the entire mower mechanism is supported therefrom and that the same may be clamped and unclamped by adjusting the bolts 52, 53 along the bar 14 and moving the entire assembly lengthwise thereof. This adapts the mower to use with tractors of different wheel widths in that if the wheel threads are extremely narrow then the mower frame may be centered with respect to the member 14 and if the wheels are widely spaced apart the mower frame may be moved to the rightward end of the member 14. Also this structure obtains the necessary tilt for the mower so that its angular inclination to the ground may be adjusted for different conditions. It will be understood that the drive through the shaft structure 54 from the power take-off shaft 55 to the rear pulley 56 is so arranged with suitable knuckles that the angular dispacement of the mower frame is accommodated. This drive proceeds from the pulley 56 through the belt 57 to the pulley 58 which drives the sickle operating mechanism through an input shaft 58' (not shown) which is coaxial with the shaft or trunnion 60 of the housing 49, as will be readily apparent from U.S. Patent 2,824,416.

Another feature of the present invention is in the novel arrangement of the gag and lifting mechanism which comprises the pull rod 65 which is pivoted as by a pin 66 to a pair of upstanding ears 67 which project upwardly from the top outboard side of the casing 49. The rod 65 extends upwardly and inwardly and at its inner end 68 is threaded and receives an adjusting nut 69 thereon which abuts against the trunnion 70 through which the rod 65 extends loosely via the aperture 71 in said trunnion, said trunnion being in the form of a pin extending at opposite ends through the ears 72 of the forward arm 73 of the bellcrank lever generally designated 74. The bellcrank lever is pivoted as at 75 at its elbow 76 on an upward leg or extension 77 (FIG. 3) of the J-shaped rear beam member 46 of the main pivot frame 38. The lever 74 has a rear or input leg 78 (FIG. 2) which is pivoted at its outer end as at 79 to one end of a link 80, the said link being inclined diagonally downwardly from 79 and having its other end pivoted as at a point 81 to one arm 82 of an operating lever 83 which is pivoted on a substantially vertical axis or point 84 at its elbow 85 via a pin 86 which is mounted in a boss 87' formed integral with the top web 30 of the rear frame member 18. The lever 83 forms an anchor means to the frame means 18.

The lever 83 is provided with an input arm 87 which is connected as at a point 88 to an actuating linkage 89 (FIG. 1) which is shown in the form of a chain connected to a rocking member 90 which is carried from a tractor support as at 91 and actuated by the power lift system 92 of the tractor hitch structure generally designated 93 which includes a pair of lift arms 94 and 95 which are interconnected by a U-shaped yoke structure 96 mounted on the tractor, the yoke structure including rearwardly extending arms 97 and 98 which at their rear ends are pivoted as at 99 and 100 to the upper ends of the links 94 and 95, the said links 94 and 95 being pivotally and operatively connected as at 100' and 101 to the spaced leg sockets 9 and 10 of the draft frame. It will be noted that the leg 12 in portion 10 is connected to one end of a chain or limiting means 102, the other end of the chain being connected as at 103 to a portion of the tractor, said chain functioning to limit the downward movement of the hitch frame 8. Thus the downward movement of the entire mower mechanism is also limited.

Referring now to FIG. 2, it will be readily seen that the operating lever 83 is a bellcrank member and that the leg 87 is provided intermediate its ends with a hook member 105 which affords a connection for one end 106 for a balance spring 107 which substantially parallels the rod 65, the spring extending grasswardly over the top web 30 of the rear member 18 of the mower frame structure and at its grassward end being provided with an adjusting nut and bolt assembly 108 which is anchored to a lug 109 which is mounted on the leg or beam 45 of the main pivot frame structure 38. Thus the spring 107 is disposed in reacting relation to the main pivot frame 38 through the lever 83, which affords anchor means, and the operating linkage which includes the lever 74 and the rod 65 to the housing 49.

Referring now to FIG. 3, it will be seen that the leg 78 of the lever 74 is provided with a stop 110 which abuts as at 111 against the upper rear edge of the diagonally upwardly and forwardly extending short leg portion 77 of the J-shaped member 46 of the main pivot frame, thus limiting the pivotal movement of the gagging and lifting lever 74.

In operation, considering the mower is in operating position as shown in FIG. 1 with the hitch 8 in its lowermost position as determined by the length of the limiting structure 102, the power lift mechanism 92 is actuated which rocks the member 90, tightening the chain 89, which in turn rotates the operating lever 83 in a clockwise direction (FIG. 2) pulling the link 80 to the left and rotating the lever 74 in a counter-clockwise direction (FIG. 3), thus pulling the rod 65 upwardly and pivoting the housing 49 in a counter-clockwise direction (FIG. 3) thereby lifting and gagging the mower bar 40. This action continues until the stop 110 engages the edge 111 of the leg portion 77 of the main supported pivot frame 38 whereupon for all intents and purposes the lever 74 and the pivot frame act as a unit and the leg 77 serves as a lever arm about the shaft or pivot point 44. Thereafter further actuation of the ram 92 which is connected at its upper end to arm 99 causes the hitch 8 together with the hitch members 11 and 12 to rise which carries the mower frame upwardly with it, thus raising the entire mower assembly. However, at the same time, in view of the fact that the entire mower assembly is pivoting about a point indicated at 112 (FIG. 1) which is different than the point of pivot 113 about which the actuating member 89 is pivoting, there is a relative difference in movement so that the lever 83 is continuously rotated in a counter-clockwise direction and thus through the lever 74 and the arm 77 continues to pivot the frame 38 upwardly to an elevated position.

An important feature of the invention is in the connection at 106 between the spring 107 and the lever 83 which is so chosen that the lever arm increases as the lever rotates in a clockwise direction and is proportioned to compensate for the unloading of the spring 107 which is under constant tension between the uppermost and lowermost limits of movement of the mower assembly. Thus the lever arm between points 86 and 106 increases as the lever 83 rotates in a clockwise direction (FIG. 2).

Another feature of the present invention is in so arranging the mower and the supporting structure which includes the pivot frame 38 so that the mower may be folded over the pivot frame 38, as shown in FIG. 3, whereby the point of connection of the outer end of the rod 65 is beneath the axis X of the pivotal connection of the housing to the pivot frame 38 and the center of gravity of the entire assembly thus is moved inwardly, that is, toward the pivot center of the shaft 44 intermediate the same and axis X. It will be seen that under these circumstances the mower sits intermediate its ends as at 114 on the forwardly projecting support leg 115 of the leaf spring support 116 which has a downwardly extending leg 117, said leg 117 being bolted as at 118 to the leg 77 of the frame member 46.

When the bar 40 is folded over in its transport position it will be seen that the rod 65, which moves freely through the aperture 71, is moved upwardly and leftwardly and is disengaged at its nut 69 from the trunnion 70. Inasmuch as the center of gravity of the entire assembly including the member 38 and the mower bar structure 40 is moved inwardly the arrangement becomes self-supporting off the ground in that the spring 107 counterbalances the mass of the frame 38 and the mower bar 40 and thus a novel yieldable mounting is provided for the mower assembly such that when it is being transported over rough terrain it gently floats up and down, thus preventing jarring with attendant discomfort to the operator and also reduces wear.

Referring to FIGURE 5, it will be noted that the upper clamp 15 engages the top side 120 of the bar 14 along a semi-cylindrical surface and that the upper clamp 15 and the lower clamp 121 have forward and rear lugs 122, 123 and 124, 125 respectively which present opposing surfaces 126, 127, 128, 129, the surfaces 128 and 129 diverging downwardly and outwardly with respect to the surfaces 126, 127 to provide tilt accommodation spaces 130 and 131. By drawing up the rear bolts 52, 53 and proportionately releasing the forward bolts 52, 53, the mower frame and thus the cutter bar will be tilted upwardly and forwardly and similarly by loosening the rear bolts and drawing up the forward bolts the mower will tilt downwardly and forwardly. The bottom clamp 121 may be provided with an upwardly extending lug or lugs 132 for positioning in holes 133 in the tube 14 to sustain the frame from shifting axially or circumferentially.

Referring to FIGURE 2 the lines $x$, $y$ and $z$ represent different positions of the spring and lever arm, namely the down position, normal position and lift position and the lines A, B and C represent the lever arm in each position which compensates for the reduction in spring tension to obtain substantially constant load in the lift linkage.

It will be understood that the foregoing description is a preferred form of the invention and it is not intended in any way to limit the scope thereof and that various other forms will become readily apparent within the purview of the appended claims.

What is claimed is:

1. In a mower mounting, the combination of a hitch having a transverse bar, mower frame means carried solely by said bar, a mower carried from the frame means and extending laterally therefrom, and common means mounting said frame means on the bar for selective positioning lengthwise of the bar and circumferentially of the bar for adjusting the lateral position and tilt of the mower.

2. In a mower mounting upon a tractor of the type having a transverse rear axle and wheel means adapted to be spaced different distances apart and carrying hitch structure for vertical movement thereon, said structure including a transversely elongated bar, a power take-off extending rearwardly from the tractor, a transversely elongated mower structure including a frame at one end comprising a clamp means said bar and means locking said clamp means to the bar for selective and individual positioning lengthwise of the bar for extending said mower structure beyond the wheel at one side of the tractor, and having means for changing the pitch of the mower structure and mower drive means including a shaft assembly connectible to the power take-off and having universal joint means accommodating shifting of the mower structure upon the bar.

3. In a mower mounting, an ambulatory support, a mower frame mounted thereon, a pivot frame extending laterally from the mower frame and having first and second ends and pivoted at said first end to said mower frame on a substantially horizontal fore and aft extending axis for vertical swinging movement, a cutter mechanism pivoted to said second end of said pivot frame and in operating position extending outwardly therefrom and having a transport position folded over said pivot frame, gag and lifting linkage operatively connected to said cutter mechanism, a force transmitting lever mounted upon said mower frame and connected at one side of its axis of pivot to the linkage, and spring means connected to said lever at the opposite side of said axis and to said pivot frame, said cutter mechanism and in operating position of the cutter mechanism having its center of gravity disposed beyond the supporting limit of the spring means and in folded position disposed within the supporting limit of the spring means whereby in folded position said pivot frame and mechanism are maintained in elevated position by the action of the spring means alone.

4. In a lifting linkage for a mower comprising frame means, a pivot frame pivoted to the frame means and swingable about a generally horizontal axis between a lowered position closely adjacent to the ground and an elevated position in which the pivot frame is positioned a substantial distance above the ground, spring means reactively connected to said pivot frame, and an operating lever pivotally mounted on said frame means and having pivotal connections to said pivot frame and spring means.

5. The invention according to claim 4 and said spring means being located in unloading relation to the lever as said pivot frame is elevated and the connection between the lever and spring means being located in lever-arm-increasing relation to said spring means as said pivot frame is elevated to compensate for unloading of the spring means.

6. In a mower, a supporting frame, a supported frame pivoted to the supporting frame and swingable about a generally horizontal axis between a lowered position having an outer end closely adjacent to the ground and an elevated position in which the outer end of the supported frame is a substantial distance above the ground, a mower pivoted to the outer end of the supported frame and having a position in extension of said supported frame and vertically swingable with respect thereto to various operating positions and to a transport position folded over with respect to said supported frame, linkage operatively connected to said mower for pivoting the same with respect to said supported frame and having a lost-motion connection with respect to said supported frame for limiting said pivoting of the mower and connecting the linkage with the supported frame for bodily lifting the supported frame, said mower in said transport position disposing the center of gravity thereof intermediate its pivotal connection and the pivotal connection of the supported frame, means reactively anchoring said linkage to said supporting frame, and said linkage including spring means extending between said means and said supported frame and said linkage and spring means proportioned to hold said supported frame and mower in said transport position thereof.

7. The invention according to claim 6 and said anchoring means comprising a lever having first, second and third points of connection and connected at said first point to the supporting frame and at said second point to a portion of the linkage between the same and the mower and at said third point to said spring means, said third point located in lever-arm increasing relation to said first point as said lever is rotated in lifting direction to said mower and supported frame.

8. In a mower, a support, a supported frame member pivoted thereto for vertical swinging movement, a mower member liftably mounted on said supported frame member, a lever pivotally mounted intermediate its ends on the support, a linkage operatively connected with one end of the lever and one of said members, spring means connected between one of said members and the other end of the lever, the point of connection between the spring means and the lever being located in lever-arm increasing relation to said pivot of the lever to the support as said lever is rotated unloading the spring means and elevating said members.

9. In a mower, the combination of a support, a frame pivoted to the support on a generally horizontal fore and aft extending axis, a mower pivoted to the frame on an axis generally parallel to said axis and having an extended position in extension of the frame and a folded position superposed with respect to the frame, and a leaf spring support for the mower mounted on the frame and seating the mower in the folded position thereof.

10. The invention according to claim 9 and said frame including a J-shaped element having a leg extending from the pivot of the frame to the mower and another leg extending diagonally upwardly from said last-mentioned pivot, and said leaf spring having a part connected to said last-mentioned leg and another part extending angularly from said first-mentioned part and providing a seat for the mower.

11. In a mower, frame means, a pivot frame, pivot means joining said frame means and pivot frame for vertical swinging movement, a mower having a pivotal connection with the pivot frame and having an extended position disposing the center of mass beyond said pivotal connection and having a folded position disposing said center of mass between said connection and said pivot means, and spring means operatively connected between the frame means and pivot frame for balancing the same off the ground in the folded position of the mower.

12. In a mower mounting, the combination of a hitch having a generally horizontal member extending transversely to the operating direction of movement of the mower, a mower support structure comprising a first clamp element, a second opposed clamp element embracing said member with said first element, said elements providing opposed lugs, bolts extending through respective opposed lugs, respective lugs presenting opposed outwardly diverging surfaces, means releasably interlocking the second element with said member against axial and circumferential displacement, said support and first element positionable about said member in various circumferentially displaced positions upon selective tightening of said bolts.

13. In a mower, frame means, a pivot frame structure having a pivotal connection to said frame means, a mower structure, pivot means interconnecting said structures, said mower structure having an extended position with respect to the pivot frame structure disposing its center of gravity beyond said pivot means and said mower structure having a folded position superposed with respect to the pivot frame structure and disposing the center of gravity of the mower structure between said connection and said pivot means, and lifting linkage including anchor means operatively interconnected between one of said structures and the frame means and including spring means and compensating means disposed in load proportioning relation to the spring means.

References Cited in the file of this patent
UNITED STATES PATENTS

| | | |
|---|---|---|
| 1,958,405 | Anthony et al. | May 15, 1934 |
| 2,289,598 | Sladecek | July 14, 1942 |
| 2,817,204 | Heinlein et al. | Dec. 24, 1957 |
| 2,884,753 | Fergason | May 5, 1959 |